United States Patent Office 3,594,361
Patented July 20, 1971

3,594,361
1,2-POLYBUTADIENE COMPOSITIONS
Chester L. Parris, Morris Plains, and Leo S. Rieve, Schooley's Mountain, N.J., assignors to Allied Chemical Corporation, New York, N.Y.
No Drawing. Filed Sept. 23, 1969, Ser. No. 860,406
Int. Cl. C08d 3/06
U.S. Cl. 260—94.3
5 Claims

ABSTRACT OF THE DISCLOSURE

Polybutadiene compositions of melting point 50°–100° C. with the major proportion of the butadiene content being combined in the 1,2 form. The co-ingredient is rubbery, amorphous butadiene polymer having vinyl double bonds and internal double bonds. The process of making employs as catalyst a complex of a cobalt compound with butadiene or open chain butadiene dimer and with an organo metallic compound of zinc, lithium or aluminum; and a catalyst modifier of fumaric acid ester or maleic acid ester. The copolymers are formulated to molding compounds which can be cured rapidly and used in transfer molding.

BACKGROUND OF THE INVENTION

The invention relates to 1,2-polybutadiene compositions, i.e. compositions wherein the major constituent is the divalent butadiene unit, combined principally in the 1,2 form, i.e. the form which provides a vinyl group pendant from the polymer chain probably in syndiotactic form, i.e. successive vinyl groups alternate in position between the two possible stereoisomeric positions (d- and l-) upon successive segments of the chain. Thus the major proportion of the butadiene content of the composition is combined in the form of the units:

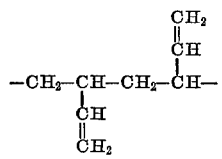

Homopolymers of 1,2-butadiene are known, including the syndiotactic and the isotactic forms—Montecatini British Pat. 835,752 published May 25, 1960, and Montecatini British Pat. 854,615 published Nov. 23, 1960. These known homopolymers are relatively high melting, having melting points of about 154° C., and 124° C., respectively when in purified form. These homopolymers are useful in molding compositions; but their high melting point makes them difficult to process in that temperatures higher than those attainable by hot water or steam are required for blending these homopolymers with other materials, such as curing agents employed in molding compositions.

SUMMARY OF THE INVENTION

Compositions in accordance with the invention overcome the above noted difficulties of processing to obtain molding compositions and the like, by virtue of their showing fusion within the temperature range broadly between about 50° C. and about 100° C. These compositions display a high rate of curability in the presence of peroxy curing agents. Moreover the compositions of the present invention have high flow characteristics so that they will readily fill an intricate mold. Furthermore the temperatures suitable for curing molding compositions, formulated from the compositions of the invention with peroxy curing agents, are relatively high (at least 120° C. and suitably 160°–190° C.) so that molding compositions thereof can be formulated without premature cure and can be charged in the fused state to a mold, e.g. as in transfer molding, and thereafter can be cured in the mold.

Besides butadiene combined in the 1,2 form the compositions of the invention contain, as the second essential ingredient an amorphous, rubbery polymer of butadiene having vinyl double bonds and internal double bonds; i.e. having the butadiene combined in the 1,2 form and also in the 1,4 form.

PREFERRED EMBODIMENTS

Typically in preferred embodiments of the composition of the invention at least 65% of the double bonds are vinyl double bonds.

For production of the copolymers of the invention, it is preferred to make up a solution in hydrocarbon solvent of a cobalt compound together with say about 1–10 times its weight of butadiene. Then an organometallic compound is added, preferably in proportions of about 1–10 mols per mol of the cobalt compound. A particularly suitable cobalt compound is bis-acetylacetonate; and particularly suitable organo metallic compounds are triethylaluminum and triisobutylaluminum. This catalyst mixture, after allowing time for complex formation between the ingredients as indicated by color change, is mixed with additional butadiene and stirred while the butadiene is polymerized to amorphous mixed 1,2- and 1,4-polybutadiene.

Then fumaric ester or maleic ester, e.g. in benzene solution, is added preferably in proportion of about 1–3 mols per mol of cobalt compound. Particularly suitable esters are dialkyl fumarates having $C_1$–$C_8$ alkyl groups.

The polymerization is then conducted in the resulting solution by supplying butadiene at temperatures from about 0° C. to about 100° C., especially 10°–70° C. These operations are conducted under a dry nitrogen atmosphere.

The catalyst is deactivated and unreacted materials are extracted by use of a low boiling alcohol such as isopropanol, suitably containing acid; and the product is washed, suitably with methanol. The wash liquid should contain an antioxidant such as an aromatic amine or a phenolic antioxidant to protect the isolated polymer during subsequent handling.

EXAMPLES

The examples which follow are illustrative of the invention and of the best mode now contemplated for carrying out the same; but the invention is not to be considered as limited to all details of the examples. Temperatures are in ° C.

EXAMPLE 1

A clean, dry 1-gallon glass-lined autoclave, previously purged with dry nitrogen was charged with 10.4 g. cobalt bis-(acetylacetonate) dihydrate, one liter of dry benzene, and 50 g. butadiene to form a complex with the cobalt compound. After 2 hours 12 g. triethylaluminum in 100 ml. benzene was added, followed by an additional 50 g. of butadiene. The reaction mixture was stirred at 25° for 16 hours. At this stage the product was amorphous and rubbery and contained both vinyl double bonds and internal double bonds as shown by infrared spectra.

A solution of 11.5 g. diethyl fumarate in 100 ml. benzene was added and then 750 g. butadiene was introduced over a period of 0.5 hour while the temperature was maintained at 25° by external cooling.

After 6 hours the autoclave was vented and the contents treated with 2 liters isopropyl alcohol containing 25 ml. conc. hydrochloric acid. The coagulated polymer was filtered, washed in a blender with methanol containing 0.5% by weight of commercial hindered polyphenol stabilizer, then collected and air dried. The yield was about 80% of free flowing white powder of rather indefinite fusion point in the range between 55° C. and 80° C. The vinyl double bond content is about 70%–80% of the total double bond content.

EXAMPLE 2

In a sigma blade mixer was dry blended 19 parts of the polybutadiene composition of Example 1, 1 part of diallyl phthalate prepolymer ("Dapon" 35 from FMC Corporation), 0.04 part of vinyl silane (coupling agent for glass), 1 part of di-alpha-cumyl peroxide, 1 part of zinc stearate and 80 parts of hydrophobic electrical grade calcium carbonate powder, all particles below 8 microns diameter. The blending was carried out for 10 minutes to insure adequate mixing. No heat was applied.

The charge was transferred to a roll mill operating at about 55°–80° C. The charge quickly "banded" on the mill. Mixing was conducted for only 1½ minutes, after which time the composition was sheeted off and allowed to cool. The non-tacky sheet could be broken into granules which do not sinter at room temperature. Two pieces pressed together between the fingers will not stick.

The resulting granular molding composition was molded by a transfer molding technique, as follows:

A preform was made by compressing the material and was placed in the heated chamber of the transfer molding apparatus. Then the chamber was closed and pressure was applied by a plunger to drive the fused composition from the chamber into a heated spiral mold, heated to temperature to cure the composition. The length to which the spiral is filled during the standard time of the molding cycle, e.g. 2 minutes, is a measure of flowability of the composition.

This molding composition was also compression molded; and the deflection under standard loading, and hardness of the test bar obtained, were determined. Lower figures for deflection and higher figures for hardness correspond to higher degrees of cure. The table below sets out the data thus obtained upon (1) the molding composition using the polybutadiene composition of Example 1; and (2) a comparison molding composition, subjected to the same procedures (except for blending temperatures), and differing only in that syndiotactic 1,2-polybutadiene homopolymer was used therein instead of the Example 1 composition. The front roll temperature required for preparing the comparison molding composition was about 120° C.; and to get a satisfactory blend required repeatedly removing the sheeted out composition and passing it endwise in rolled up form again through the mill to form a sheet again.

TABLE (1) Molding compound of the invention:

Heat distortion temperature (ASTM Test D-648)—about 260° C.
Flowability (cure at 149° C.)—16 inches
Deflection (cure at 149° C., 4 mins.)—100 mm.
Hardness by Barcol Test (cure at 167° C., 4 mins.)—66

(2) Comparison molding composition:

Heat distortion temperature—about 260° C.
Flowability—1 inch
Deflection—56 mm.
Hardness—70

The above data show that a molding compound based on the composition of the invention can readily be formulated at temperatures attainable with hot water or low pressure steam; and the resulting molding compound cures rapidly, similarly to 1,2-polybutadiene homopolymer. (The differences are attributable to the rubbery character of the co-ingredient rather than to slower curing.) Moreover the molding compound of the invention has very good flowability, which is not found in the comparison molding compound.

A preferred process for obtaining the compositions of this invention has been described above. As an alternative to using a complex catalyst of cobalt compound with butadiene, a cobalt complex with a butadiene open chain dimer can be used; and as an alternative to the organo aluminum compound catalyst ingredient, an organo zinc or organo lithium compound can be used. When using these alternatives under conditions otherwise in the same ranges as above, set out, similar results to the above are obtained.

The invention claimed is:

1. In a process of polymerizing butadiene, the improvement for combining the major proportion of the butadiene in 1,2 form and obtaining a composition of fusion range between about 50° C. and about 100° C., which comprises utilizing as initial catalyst a complex of a cobalt compound with butadiene or an open chain butadiene dimer, and with an organo metallic compound of zinc, lithium or aluminum and polymerizing butadiene to amorphous, rubbery polybutadiene having vinyl double bonds and internal double bonds; and thereafter adding as catalyst modifier a fumaric acid ester or maleic acid ester and continuing polymerization of butadiene to obtain principally 1,2-polybutadiene.

2. Process of claim 1 wherein said catalyst modifier is a dialkyl fumarate having $C_1$–$C_8$ alkyl groups.

3. A polybutadiene composition having melting point within the range between about 50° C. and about 100° C. wherein the major constituent is a butadiene polymer having the major proportion of the butadiene content combined in the 1,2 form; and the essential co-ingredient is an amorphous, rubbery polymer of butadiene having vinyl double bonds and internal double bonds which is obtained by initially polymerizing butadiene to amorphous, rubbery polybutadiene having vinyl double bonds and internal double bonds utilizing as initial catalyst a complex of a cobalt compound with butadiene or an open chain butadiene dimer, and with an organo metallic compound of zinc, lithium or aluminum; and thereafter adding as catalyst modifier a fumaric acid ester or maleic acid ester and polymerizing butadiene to obtain principally 1,2-polybutadiene.

4. Composition of claim 3 wherein at least 65% of the double bonds of the composition are vinyl double bonds.

5. In a molding composition comprising a hydrocarbon polymer with high content of vinyl groups and a curing agent for said polymer, the improvement which comprises employing as said polymer the polybutadiene composition of claim 4.

References Cited

UNITED STATES PATENTS

| | | | |
|---|---|---|---|
| 3,045,001 | 7/1962 | Berger | 260—93.5 |
| 3,182,051 | 5/1965 | Marullo et al. | 260—94.3 |
| 3,405,114 | 10/1968 | Naarmann et al. | 260—94.3 |

JOSEPH L. SCHOFER, Primary Examiner

R. A. GAITHER, Assistant Examiner

U.S. Cl. X.R.

260—94.7